(12) United States Patent
Pellegrotti et al.

(10) Patent No.: US 11,876,333 B2
(45) Date of Patent: Jan. 16, 2024

(54) AUTOMATED SYSTEM FOR THE ELECTRICAL CONNECTION AND DISCONNECTION OF REFRIGERATED CONTAINERS TO A POWER SUPPLY AND/OR DATA TRANSMISSION NETWORK

(71) Applicant: ARMS S.R.L., Genoa (IT)

(72) Inventors: Fulvio Pellegrotti, La Spezia (IT); Alessandro Becce, Quartu Sant'Elena (IT); Pierluigi Curletto, Genoa (IT); Vincenzo Minopoli, Naples (IT)

( * ) Notice: Subject to any disclaimer, the term of this patent is extended or adjusted under 35 U.S.C. 154(b) by 457 days.

(21) Appl. No.: 17/059,134

(22) PCT Filed: May 24, 2019

(86) PCT No.: PCT/IB2019/054327
§ 371 (c)(1),
(2) Date: Nov. 25, 2020

(87) PCT Pub. No.: WO2019/224792
PCT Pub. Date: Nov. 28, 2019

(65) Prior Publication Data
US 2021/0218212 A1    Jul. 15, 2021

(30) Foreign Application Priority Data
May 25, 2018  (IT) .......................... 102018000005738

(51) Int. Cl.
*H01R 43/26* (2006.01)
*B63B 69/00* (2013.01)
*F25D 29/00* (2006.01)

(52) U.S. Cl.
CPC ............. *H01R 43/26* (2013.01); *B63B 69/00* (2013.01); *F25D 29/003* (2013.01)

(58) Field of Classification Search
CPC ....... F25D 29/003; H01R 43/26; B63B 69/00; B66C 13/12; B25J 11/00; B25J 5/04;
(Continued)

(56) References Cited

U.S. PATENT DOCUMENTS 4,959,020 A * 9/1990 Di Rosa ............... H01R 13/631
439/138
2017/0312921 A1* 11/2017 Kobayashi ............. B25J 9/1687

FOREIGN PATENT DOCUMENTS

KR        20090049305 A   *  5/2009

OTHER PUBLICATIONS

Wikipedia, "Electric switchboard", retrieved from https://en.wikipedia.org/wiki/Electric_switchboard on Aug. 28, 2023 (Year: 2023).*
(Continued)

*Primary Examiner* — Ryan Johnson
(74) *Attorney, Agent, or Firm* — Collaborative IP; Paul Ditmyer

(57) ABSTRACT

System for connecting and/or disconnecting the power supply and/or data connection for refrigerated containers in the port, storage and interchange field and/or on board ship, which container is provided with at least one electrical connector for connection to a power supply and/or data transmission network. The system comprises automated means for the electrical connection and disconnection of the said electrical connector to/from the said power supply and/or data transmission network, which means comprise at least one mechanical arm.

9 Claims, 7 Drawing Sheets

(58) Field of Classification Search
CPC .......... B25J 5/02; B65D 90/002; B60L 53/14; B60L 53/35
See application file for complete search history.

(56) References Cited

OTHER PUBLICATIONS

Merriam-Webster, "Switchboard Definition & Meaning", retrieved from https://www.merriam-webster.com/dictionary/switchboard on Aug. 28, 2023 (Year: 2023).*

Dictionary.com, "Switchboard Definition & Meaning", retrieved from https://www.dictionary.com/browse/switchboard (Year: 2023).*

* cited by examiner

AUTOMATED SYSTEM FOR THE ELECTRICAL CONNECTION AND DISCONNECTION OF REFRIGERATED CONTAINERS TO A POWER SUPPLY AND/OR DATA TRANSMISSION NETWORK

CROSS REFERENCE OF RELATED APPLICATIONS

This application is a U.S. National Phase 371 Application of International Application No. PCT/IB2019/054327 filed on May 24, 2019, which claims priority to Italian Patent Application No. 102018000005738, filed on May 25, 2018, the contents of the above-referenced applications are hereby expressly incorporated herein by reference in their entirety.

The present invention relates to an automated system for connecting and/or disconnecting the power supply and/or data connection for refrigerated containers, or reefers, in the port, storage and interchange field and/or on board ship, which container is provided with at least one electrical connector for connection to a power supply and/or data transmission network.

The refrigerated container is equipped with an electric compressor for maintaining controlled internal conditions (temperature, humidity) according to the type of goods stored that must be maintained during all phases of transport and intermediate storage, in order to avoid deterioration and loss of load with consequent legal actions for compensation for damages and insurance costs for their coverage.

The refrigerated container requires an electrical connection for the compressor supply and a data connection for setting the operating parameters and for their monitoring, transmission and recording.

Both container storage sites and container transport facilities must have electrical outlets to power the refrigerated containers, ensuring the connection, storage and monitoring of the setting parameters.

The storage of these containers in the port area is facilitated mostly by dedicated structures for access to containers called "reefer racks" consisting of metal joinery structures used to position reefer containers in appropriately equipped and dedicated yard areas and including gangways to ensure access to the personnel to refrigerated containers. The reefer racks are equipped with supply points in a number equal to the storage capacity of the containers. These structures allow operators access to containers that can therefore be stored on multiple levels in areas served by mechanical means (for example, rail or wheeled cranes) used for their movement.

Every movement currently requires a human intervention to connect and/or disconnect the container to/from the power supply network and this event occurs not only when the container is received or delivered, but also during discarding processes related to the movement of containers underneath others stacked on top of them.

These elements are also present on board ship when embarking or disembarking the container.

The need for constant human presence in high-risk port areas due to the simultaneous presence of container lifting and handling means creates a serious work safety problem for connection and disconnection of refrigerated containers. Port, storage and interchange security is an absolute priority, since port activities are intrinsically dangerous due to the commingling between human activities and operational means in the yards.

A further critical element is given by the numerous disputes related to the damages connected to delays in the connections resulting from a lack of synchronization between the movements of the refrigerated containers and their connection to the electric supply, resulting in the loss of the set temperature and humidity parameters with consequent deterioration of goods and related legal actions, with direct costs linked to the reimbursement of deductibles and indirect costs related to insurance premiums for risk coverage. The synchronization of the handling of the containers with the connection and disconnection of the electrical supply is therefore particularly critical for maintaining the quality of the service.

These critical issues are also present on board ship where the increased dimensions of the hold capacity can lead to high volumes of unloading of refrigerated containers with high risks of lack of synchronization between the disconnection of the power supply and the actual movement of the container, thus involving the same problems (described above) in terms of work safety, costs and quality of service that are found in the port area—container terminal side.

Since the trend of refrigerated goods is growing strongly and the size of container ships and the related landing volumes is growing more and more, the criticality related to the automation of refrigerated container connections and the synchronization between the electrical connection and their actual handling always assumes greater relevance for all the actors involved in the process.

There is therefore a need not yet satisfied with a system that automates the manual activities necessary for the connection and disconnection of refrigerated containers, both as regards the electric power supply and the data connection.

The present invention aims to overcome the drawbacks of current completely manual systems for connecting refrigerated containers both in ports and on ships, by using automatic or semi-automatic systems for electrical connection and disconnection to a fixed power supply and/or data transmission network.

The present invention aims to overcome the drawbacks with a system as described at the beginning, which also includes automated means for the electrical connection and disconnection of the electrical connector to/from the power supply and/or data transmission network, which means comprise at least one mechanical arm.

The present invention allows to obtain the following advantages:
improving safety by eliminating the need for human interaction with the container; in the specific port context, the need for the presence of human activities in high-risk areas of the yard is eliminated due to the presence of moving mechanical means;
Improving the quality of the provided service by synchronizing in real time the connection/disconnection times of refrigerated containers with their actual movement both in the context of storage areas and on board ship; in the specific port area, such synchronization for refrigerated containers reduces the duration of power supply lack, which can modify the set temperature and humidity parameters inside the container, compromising the conservation of the goods;
improving the efficiency of operations by reducing the direct costs related to the resources dedicated to the activities now performed manually that are to be automated;
in the port area, improving the flexibility in the use of the yard areas and the management of seasonality peaks;
improving efficiency through the reduction of indirect costs related to the reduction of insurance costs resulting from the improvement of service quality.

The system has been designed in different configurations to adapt to customer needs. This means various levels of increasing automation, suitable for serving one or more refrigerated containers or more generally devices powered by electric current and provided with a data connection.

In the refrigerated containers currently in use, the said connector of each container is connected to the electrical system of the container itself by means of a cable, and the container is provided with a cable basket.

In an embodiment, a movable connector is provided connected to the power supply and/or data transmission network, which movable connector is moved by the mechanical arm.

To facilitate connection operations, in an embodiment example, the system comprises a switchboard, which acts as an interconnection element between the container connector and the movable connector moved by the mechanical arm.

The switchboard can be applied to the container by fixing means.

The fixing means can be of any type, and can ensure a fixed application of the switchboard to the container, or optionally they can perform a removable type fixing. In the latter case the fixing means can consist of either a mechanical gripper or magnetic or vacuum systems.

The switchboard is provided with a container side connector able to connect to the connector of the container and at least a mechanical arm side connector, which is able to connect with the movable connector moved by the mechanical arm for connection to the power supply and/or data transmission network. The container side connector and the mechanical arm side connector of the switchboard are electrically connected to each other inside the drawer.—The mechanical arm side connector of the switchboard is therefore suitable to receive the movable connector mounted on the head of the arm that operates the automated connection/disconnection, in turn connected to the power supply and/or data network.

In an optional embodiment, the switchboard is equipped—on the container side—with an automatic ejection mechanism of the container connector from the container side connector of the switchboard, which can thus expel this connector directly inside the cable basket at the time of a relevant command. In fact, this ejection can be operated by a remote signal or, alternatively or in combination, by a local electronic unit connected to sensors. Thanks to this mechanism, disconnection can take place automatically without the need for intervention by specialized personnel. In this optional embodiment, therefore, the switchboard is removable and can be removed from the refrigerated container by means of the robotic mechanical arm, automatically releasing it and removing it.

In a further embodiment, the switchboard is provided with an electrical switch between the first connector and the second connector.

In a variant embodiment, the system comprises a fixed switchboard integrated in the container and provided with at least one mechanical arm side connector, which is adapted to connect with the power supply and/or data transmission network.

In an embodiment example, the switchboard is provided with a transmission unit via radio waves of the data received from the container.

According to an embodiment, the movable connector is displaced by the mechanical arm for coupling and/or decoupling the movable connector to the mechanical arm side connector of the switchboard.

The mechanical arm makes it possible to automate the connection of the container to the power supply and/or data transmission network, which can therefore be done automatically without the need for intervention by specialized personnel.

The mechanical arm connects the movable connector to the mechanical arm side connector of the switchboard.

In a further embodiment, the movable connector is connected to the power supply and/or data transmission network by means of an electric cable, which electric cable is wound on a winder provided with an automatic winding mechanism.

This allows an automatic retrieval of the movable connector and its cable. The rewinder can always be active and constantly exert a force that contrasts that of the mechanical arm so that when the mechanical arm is released and/or the movable connector is ejected, the cable is automatically rewound. Alternatively, the rewinder can be activated only when the rewinding of the cable is necessary. In a further embodiment, the mechanical arm is provided with one or more joints.

In a further embodiment, the mechanical arm is at least partly telescopic.

In a further embodiment, the mechanical arm has a pointing system to identify the position of the mechanical arm side connector of the switchboard. The pointing system can include cameras mounted on the reefer rack and/or on the mechanical arm itself, or other types of pointing (radio, capacitive, inductive, laser, ultrasound or similar waves).

Once the mechanical arm side connector of the switchboard has been identified, an automatic adjustment system moves the mechanical arm so as to connect the movable connector to the mechanical arm side connector of the switchboard, making the power supply and/or data electrical connection.

In a further embodiment, the mechanical arm is translatable on at least two axes, preferably on the three axes in such a way that it can be positioned near each container of a plurality of said containers.

This allows to have only one mechanical arm, or a reduced number of mechanical arms, to operate on a plurality of containers.

According to an improvement, the mechanical arm is provided at its free end with a gripping member for a said movable connector.

In this way the mechanical arm can be moved initially to a position in which it picks up the movable connector and then in a position corresponding to the mechanical arm side connector of the switchboard, in which it can make the connection.

In an embodiment example, the system can be installed on a refrigerated container storage structure, which storage structure comprises a plurality of stations, each station being provided for a refrigerated container, in which a dedicated mechanical arm is provided for at least part of the stations for each location.

According to this variant embodiment, each container has a dedicated mechanical arm. This proves to be particularly advantageous in the installation of the system in pre-existing structures, for example pre-existing reefer racks or in the holds of container ships in which there are narrow spaces and constraints between metal joinery and containers. In this case the totality, or even only part, of the reefer rack slots is provided with its own mechanical arm.

In a further embodiment, the system comprises a unit for monitoring the operating parameters of the refrigerated containers, such as for example the absorbed power, the consumed energy, current and voltage, internal temperature and humidity.

In a further embodiment, in combination or as an alternative to what has been described above, systems are envisaged for transmitting electricity between the fixed network and containers by means of magnetic induction. The magnetic induction connection means can comprise circuits which can be coupled by magnetic induction located respectively in the mechanical arm and in the switchboard.

These and other features and advantages of the present invention will become clearer from the following description of some non-limiting embodiment examples illustrated in the attached drawings in which.

Figure 1:
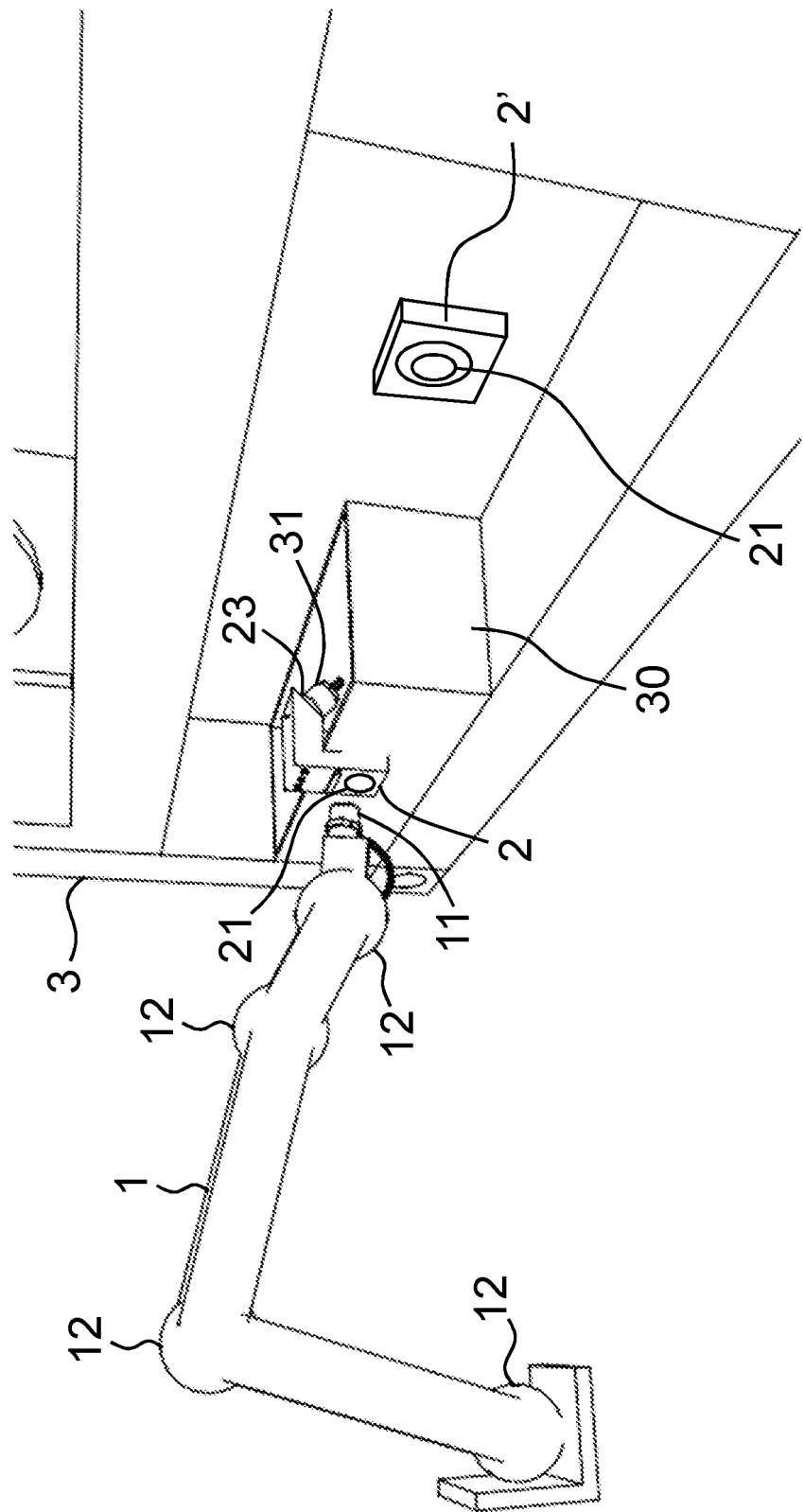
FIG. 1 shows an exemplary embodiment of the system.

FIG. 1 shows an embodiment example of the system for the electrical connection and disconnection of refrigerated containers 3 to a power supply and/or data transmission network in the port area. Each refrigerated container 3 is provided with an electric compressor for maintaining the desired conditions inside it and a connector 31 for the power supply of the compressor and/or for the data connection for setting and/or communicating the operating parameters, their monitoring, transmission and registration.

It is possible to provide a single connector 31 of the container both for the power supply and for the data connection, or it is possible to provide two separate connectors, a connector 31 for the power supply and a connector 34 (see for example FIG. 3) for data connection.

Figure 8:
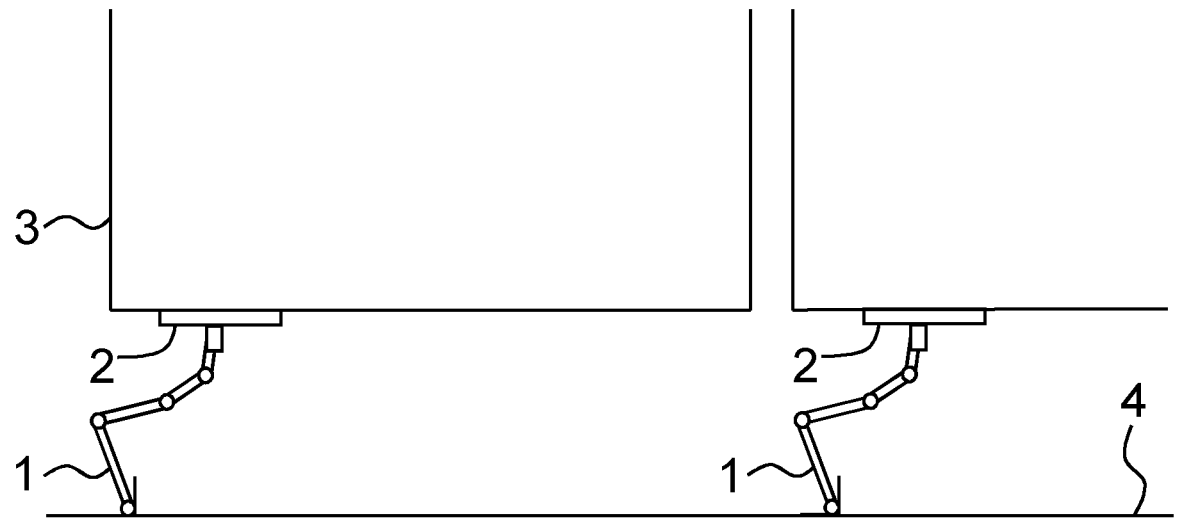
FIG. 8 shows a top view of a further exemplary embodiment with a mechanical arm for each storage position of the reefer rack.
Figure 8:
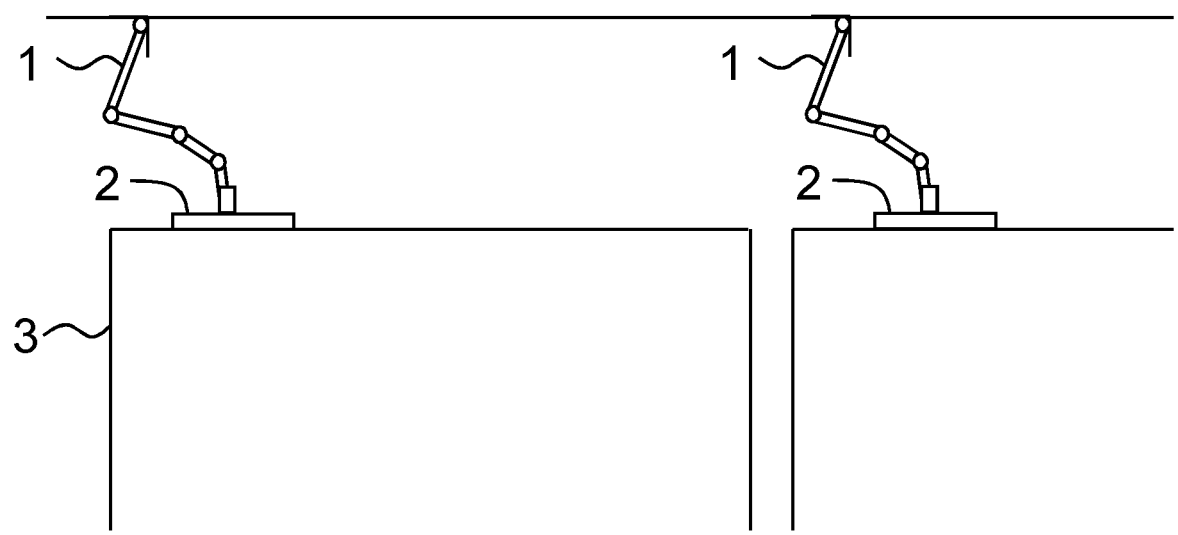

The reefer racks are metal joinery structures constituted by gangways 4 on several planes, as illustrated in FIG. 8, which allow the access of the personnel assigned to the management of the operations of power supply connection/disconnection of containers 3, and in particular of their refrigerating apparatuses, and of the possible monitoring of their operating parameters.

As shown in FIG. 8, the containers 3 are placed in front of the gangway 4 of the reefer rack on each of the two sides of the same, oriented in such a way that the part of the container 3 where the compressor is located is positioned in front of the gangway 4 and of a power socket provided on the gangway 4 at the station or slot of each container 3.

Each container 3 is equipped with a basket 30 inserted in the front of the compressor. In the basket 30 the power supply cable 32 is positioned for connection to the socket, visible in FIG. 2, which power cable 32 terminates with said connector 31. This cable 32 is previously connected, upon disembarking from the ship or upon arrival at the entrance gate to the port, to a switchboard 2 for subsequent automatic connection, by means of a robotic mechanical arm 1 which moves a connected movable connector 11 to the power supply network. In an optional embodiment the switchboard 2 is fixed to the container 3 in a removable manner.

Figure 2:
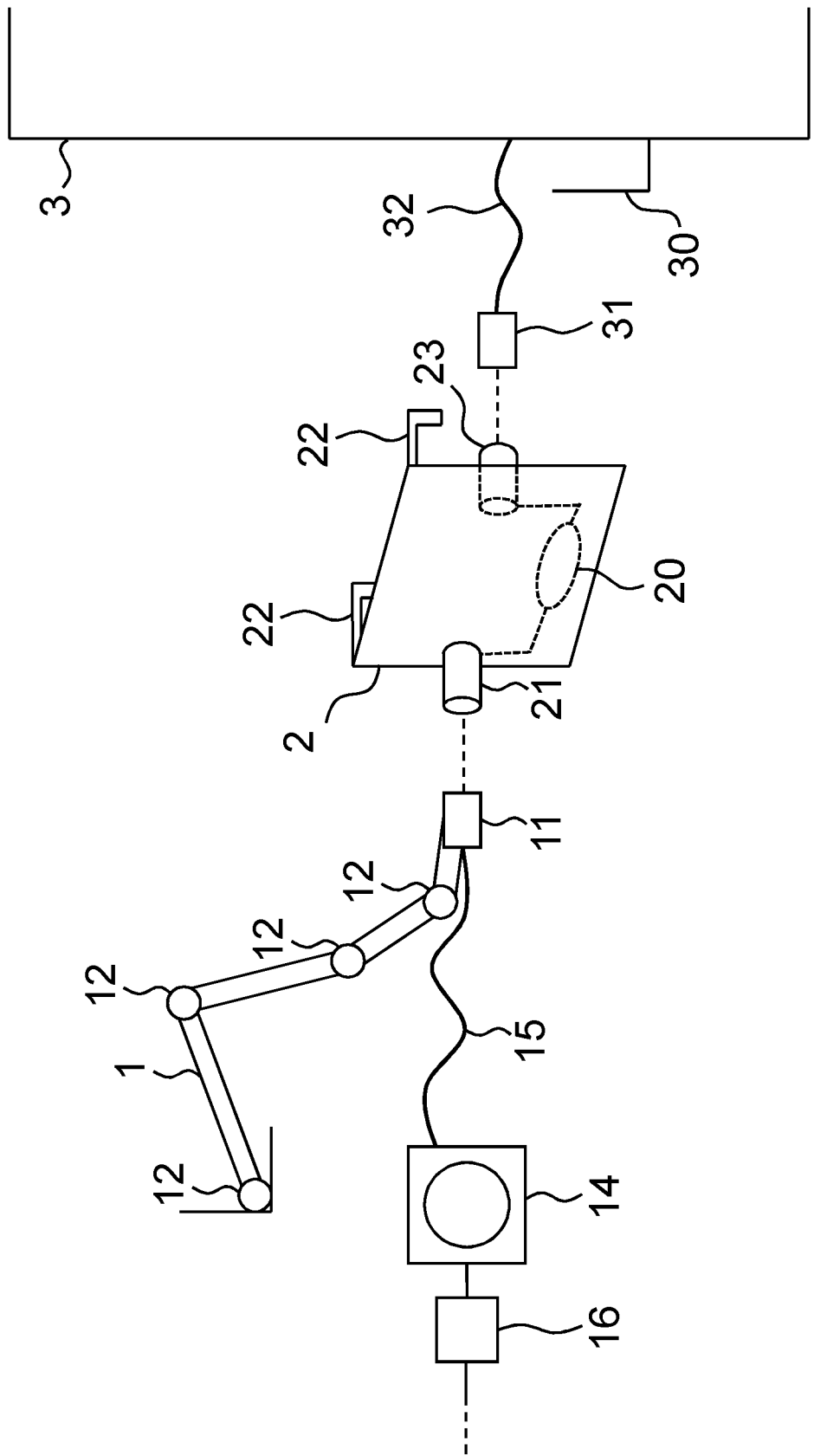
FIG. 2 shows a diagram of the system with a removable switchboard.

The elements of FIG. 2 are illustrated purely by way of example, without any reference to their shape and size.

Alternatively, the switchboard 2 is fixed and integrated in the container 3, as shown in the figures with the number 2'. In this case, the switchboard 2' consists of an element which is mounted directly on the container 3, connected with the control panel and with the supply system of the container 3 so as to offer a fixed interface both for power supply and eventually for the data.

FIG. 1 shows both the external switchboard 2 and the fixed switchboard 2'. In the use of already existing refrigerated containers, the use of an external switchboard 2 allows not to modify the container in any way. The installation of a fixed switchboard 2' is instead more expensive when it comes to applying a retrofit to an existing container, but it is advantageous if it is provided during the manufacture of a new container.

The fixed switchboard 2' can be provided as an alternative to the connector 31 with the cable 32. In the case where only the fixed switchboard 2' is used, therefore, the container is not provided with the connector 31 or with the relative cable 32, but can be connected to the power supply network only through the mechanical arm side connector 21.

Figure 4:
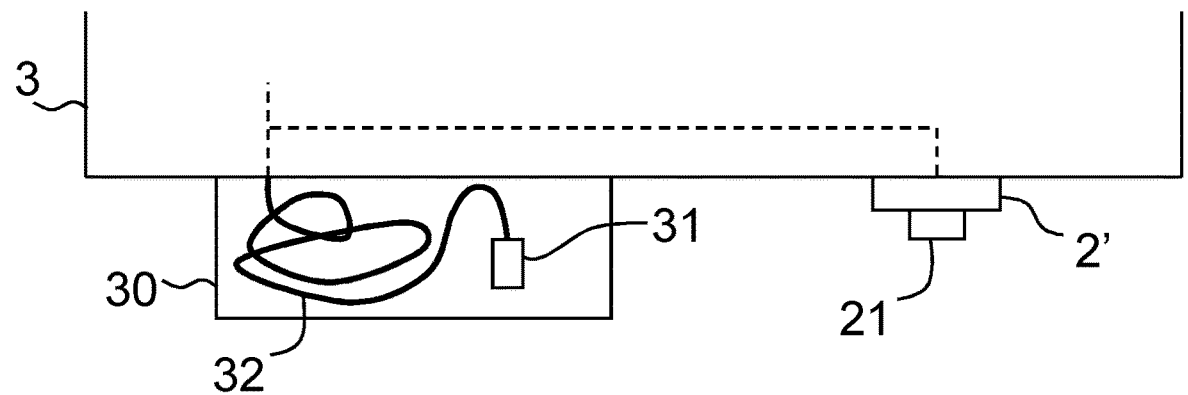
FIG. 4 shows a top view with a fixed switchboard.
Figure 5:
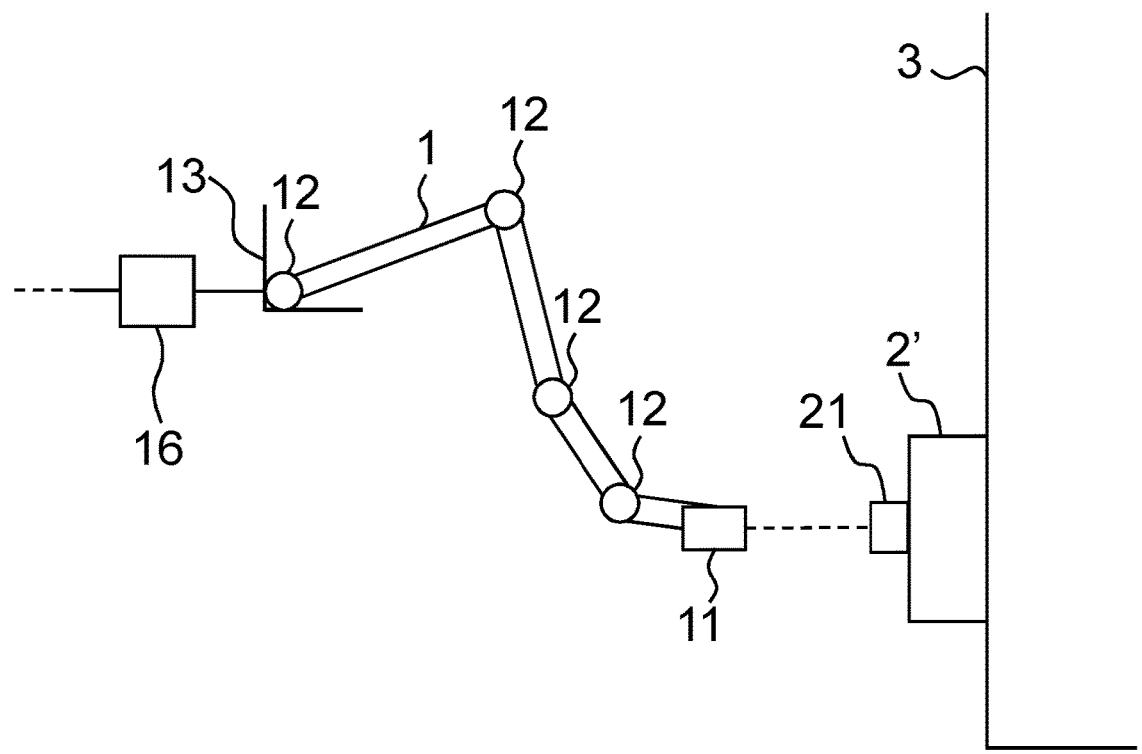
FIG. 5 shows a diagram of the system with a movable switchboard.

In the example in FIG. 1 or 4, the two components are both present on the container 3 and the fixed switchboard 2' is connected in parallel to the connector 31.

The fixed switchboard 2', when provided in combination with the movable connector 31, can be internally provided with an electric switch that selects the line being fed and isolates the not connected line: therefore, if the cable 32 is connected by means of the connector 31, the mechanical arm side connector 21 of the fixed switchboard 2' remains isolated and vice versa.

The movable connector 11 displaced by the mechanical arm 1 is connected to the power supply network by a junction unit 16 and/or to the data transmission network by means of a junction unit 16'. The movable connector 11 is moved by the mechanical arm 1 to be coupled or uncoupled to the mechanical arm side connector 21 of the switchboard 2. The movable connector 11 can be integrated on the head of the mechanical arm 1. Alternatively, the mechanical arm is provided with a gripping member for gripping and moving the movable connector 11, for example a gripper or other suitable gripping members.

An engagement mechanism is provided between the robotic arm 1 and the switchboard 2 which allows the robotic arm 1 to identify the target, that is the the mechanical arm side connector 21 of the switchboard 2, and to connect or disconnect automatically according to the received commands. This mechanism may consist of an electrical coupling (for example a bayonet coupling) between the mechanical arm side connector 21 mounted on the switchboard 2 and the movable connector 11 mounted on the head of the arm 1. A coupling system is therefore provided for the movable connector 11 mounted on top of the arm 1 which allows the robotic arm 1 to automatically connect or disconnect both the power and the data supply, recognizing the target, by means of an optical or other type system and automatically perform both the hooking and the release of the movable connector 11.

The engagement mechanism includes the contacts for power supply and contacts for data transmission and can house, in the part connected to the head of the arm 1, an optical system (e.g. miniature camera) and/or a laser pointer or a pointer of another nature for the recognition of the target, represented by the connector on the mechanical arm 21 present on the switchboard 2, to guide the positioning of the arm 1 and make the electrical connection.

In the case where a single connection is provided for both the power supply and the data connection, the movable connector 11 integrates the terminals for power transmission with those for data transmission, thus allowing the connection between container and terminal/ship with a single socket and therefore with a single movement. The integration of the terminals for power transmission with those of the data is correspondingly provided in the mechanical arm side connector 21 of the switchboard 2 and, optionally, in the connector 31 and in the container side connector 23 if present.

Figure 3:
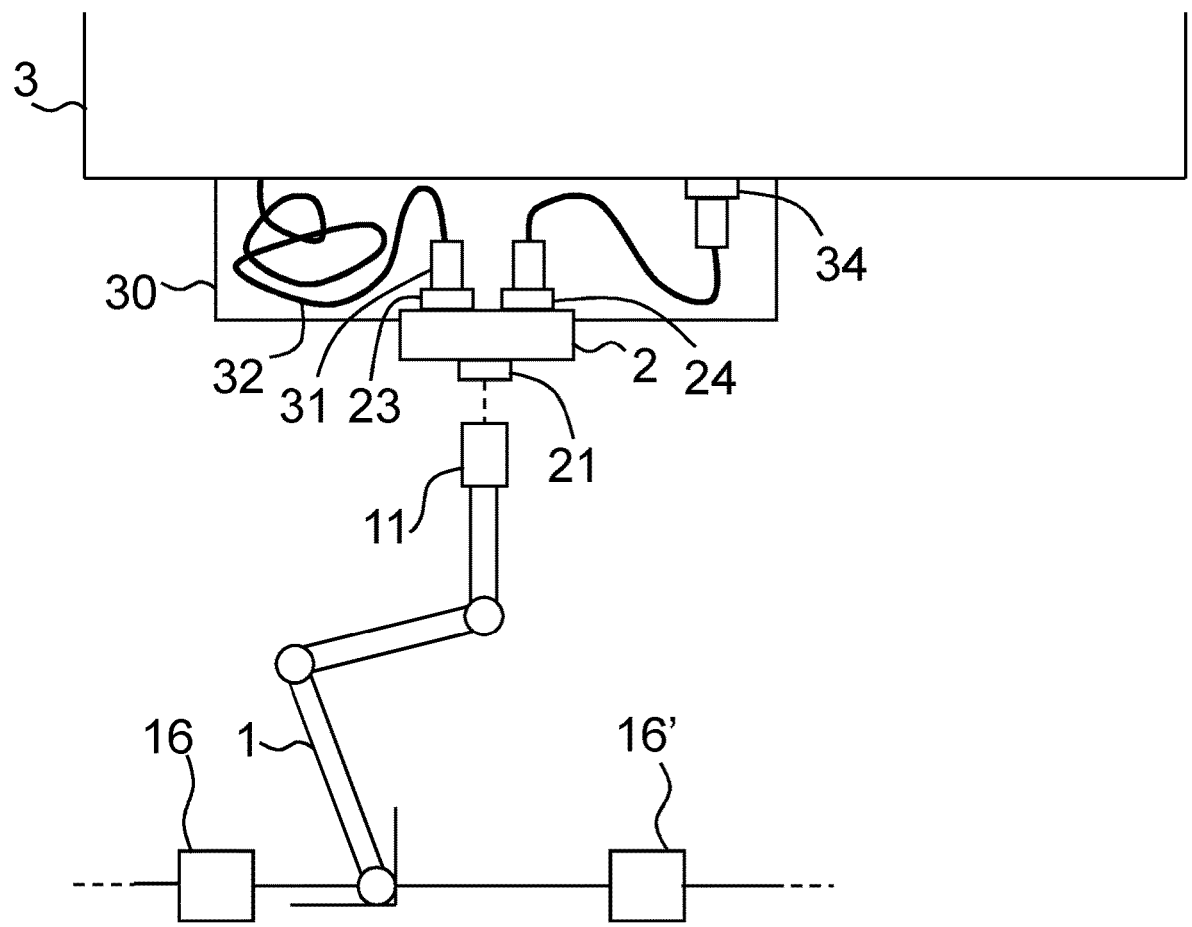
FIG. 3 shows a top view with a removable switchboard and separate power and data connections.

FIG. 3 illustrates an embodiment example in which the switchboard 2 has, in addition to the container side connector 23 connected with the container connector 31, a data connector 24 configured for data transmission and connected by cable to a corresponding data connector 34 of the container 3. In this case, the mechanical arm side connector 21 integrates the terminals for power transmission with those for data, as well as the movable connector 11 of the mechanical arm 1.

The robotic arm 1 is the electromechanical connection drive capable of a positioning movement on three axes and a possible movement of the terminal part to allow the connection of the electrical contacts.

In the absence of a fixed switchboard 2', the connector 31 is initially manually connected by an operator to the container side connector 23 of the switchboard 2, positioned so as to be subsequently ejected in the basket 30.

According to a variant embodiment, the switchboard 2 comprises a casing equipped with mechanical grippers 22, schematized in FIG. 2, for hooking to the outside of the basket 30. The removable switchboard 2 has a power-assisted mechanism for releasing the mechanical grippers 22 for hooking to the basket: the mechanical grippers 22 can be moved from a restraining position to a release position and can be remotely controlled. The removable switchboard 2 is thus provided with a mechanical coupling mechanism at the edge of the cable collection basket 30, which is operated in closing by the operator who positions it, while the release command is managed by the system. The configuration allows the optional manual release to manage any emergencies.

According to a further embodiment variant, the switchboard 2 is provided with a vacuum system, constituted for example by one or more concentric sealing rings, for adhesion to a surface of the refrigerated container 3.

The switchboard 2 is positioned in correspondence with and above the basket 30 for collecting the power supply cable 32 so as to convey the ejection of the connector 31 connected to the power supply cable 32 on board the refrigerated container 3 directly in the collection basket 30 below.

The switchboard 2 can be provided with an internal switch 20 adapted to interrupt the electrical connection between the container side connector 23 and the mechanical arm side connector 21 upon the system's request.

Alternatively or in combination, the mechanical arm 1 can remove the movable connector 11 from the mechanical arm side connector 21.

Figure 6:
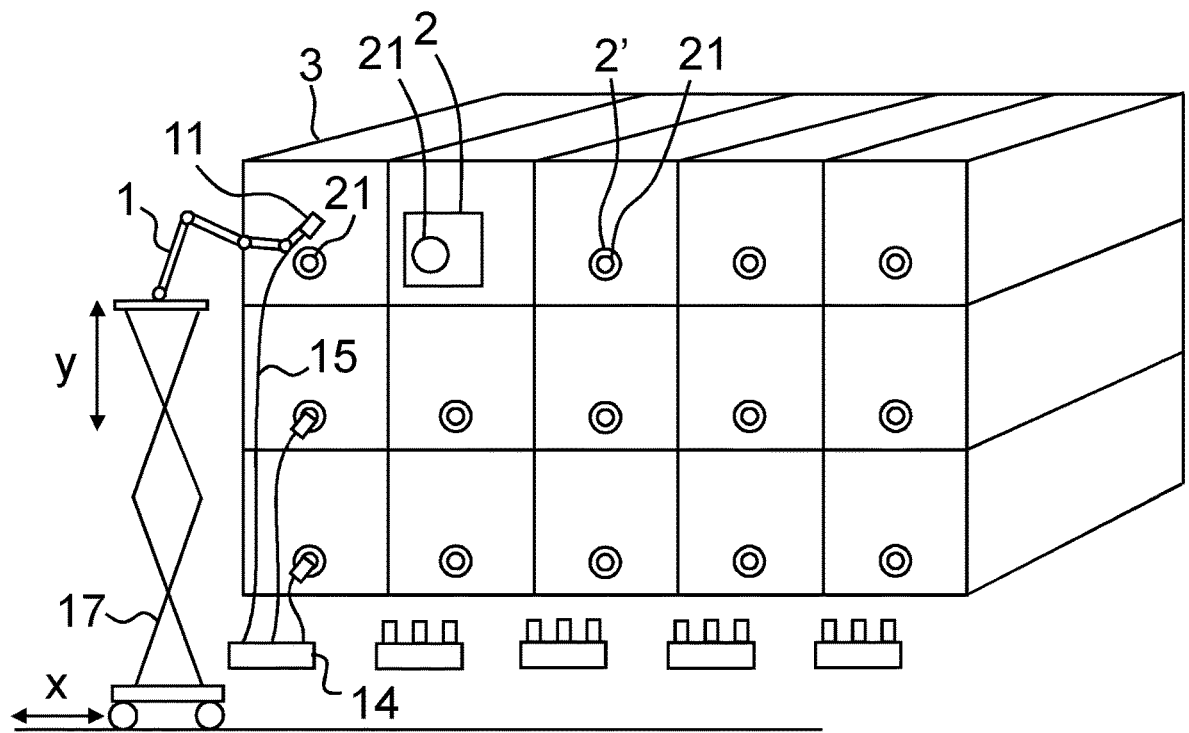
FIG. 6 illustrates an exemplary embodiment without a reefer rack.

The presence of the fixed switchboard 2' provided directly on the wall of the container 3 proves particularly advantageous, although not necessary, for the configuration of FIG. 6. In this configuration there is no reefer rack and the containers 3 are stacked one on top of the other. In front of each column of containers 3 there is a plurality of movable connectors 11, preferably in the number of containers in the column. Each movable connector 11 is connected to the power supply and/or data transmission network by means of a cable 15, preferably wound on a rewinder 14.

The mechanical arm 1 is placed on a movable carriage 17 provided with lifting means. In this way the mechanical arm 1 can grasp the movable connector 11 from its original station, move it at the mechanical arm side connector 21 of the switchboard 2 of the selected container 3, and insert the movable connector 11 making the connection. In the same way, the movable connector 11 can be extracted from the mechanical arm side connector 21 of the switchboard 2 and returned to its original position, performing the disconnection.

In a further embodiment, the mechanical arm 1 is connected to the reefer rack so that it can move on each of the slots according to the instructions received from the Terminal Operating System (TOS). For this purpose the mechanical arm is connected to a control unit that receives command data from the TOS. It is possible to provide horizontal and/or vertical translation means to perform such movements, for example by means of suitable electrically driven guides and slides or other currently known methods.

This movement mechanism of the mechanical arm 1, with also the possibility of positioning on both sides of the gangway 4 on any of the slots of the rack, is preferable in the case of reefer racks to be built. On existing ones, on the other hand, taking into account the limited spaces and the constraints between metal joinery and container 3 it is advantageous to provide a mechanical arm 1 for each slot.

The mechanical arm 1 can be telescopic and/or be constituted by a plurality of sectors connected to each other by joints 12.

Figure 7:
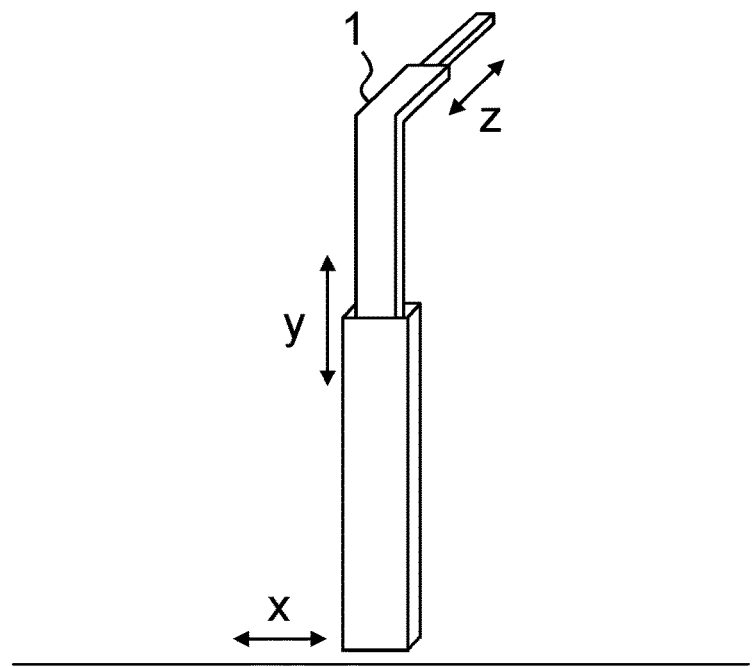
FIG. 7 illustrates an exemplary embodiment of a mechanical arm.

In the embodiment example of FIG. 7, the mechanical arm 1 is of the Cartesian type and can move along an axis x, for example being mounted on a carriage sliding on rails or according to another currently known translation method, it is telescopic in height and therefore it can lengthen or shorten along the y axis, and it is telescopic in depth, being able to lengthen or shorten along the z axis to reach the containers 3.

Unlike the manual procedure, where the operator extracts the cable from the basket 30 on board the refrigerated container 3 and connects the connector 31 to the power socket in the rack in front of the slot in which the container 3 was previously positioned by the crane, each slot of the rack is provided with its own cable 15, wound on the drum of a rewinder 14 and positioned on the structure of the rack, which ends with a movable connector 11 which is managed by the robotic arm 1 for connection to the removable switchboard 2 on the container 3.

Once it has received the order from the TOS, the mechanical arm 1 positions itself in correspondence with the slot to be operated, grips the movable connector 11 by unwinding the cable 15 from the drum of the rewinder 14 and connects the same to the mechanical arm side connector 21 of the removable switchboard 2 on the container 3.

The connection of the movable connector 11 by the robotic arm 1 is carried out with the aid of a pointing system that recognizes the position of the mechanical arm side connector 21 present on the switchboard 2.

It is possible to provide a camera system that allows a video to be sent to a remote control cabin of the mechanical arm 1 to allow remote control of the arm 1 by an operator.

In a simplified embodiment, the assistance of the robotic arm 1 for the connection is not provided, limiting the functionality only to the automatic disconnection of the container 3. In this case, the disconnection has two modes:

A) with recovery of the switchboard 2 in a removable configuration:
1. ejection of the connector 31 of the container 3 from the first connector 23, with the fall of the connector 31 itself in the basket 30 for recovery of the cable 32 on board the container 3;
2. deactivation of the fixing means of the removable switchboard 2 to the container 3.
3. simultaneous recovery of the cable 15 and of the removable switchboard 2 through the rewinder 14 of the cable 15 placed on the structure of the rack;

B) without recovery of the switchboard 2:
1. maintenance of the fixing means of the removable switchboard 2 to the container 3;
2. ejection of the movable connector 11 from the second connector 21 and rewinding of the power supply cable 15 on the recovery roller of the rewinder 14.

Solution B) can be used along with the presence of the robotic arm 1 to speed up the disconnection procedure when a container 3 stacked under others must be moved but requires first the disconnection and movement of the containers stacked above it.

In a further example without removable switchboard 2, the mechanical arm 1 positions the movable connector 11 near the connector 31. An operator manually connects the connector 31 to the movable connector 11 to make the connection. To perform the disconnection, the movable connector 11 automatically ejects the connector 31, and the mechanical arm 1 withdraws into the rest position.

Figure 9:
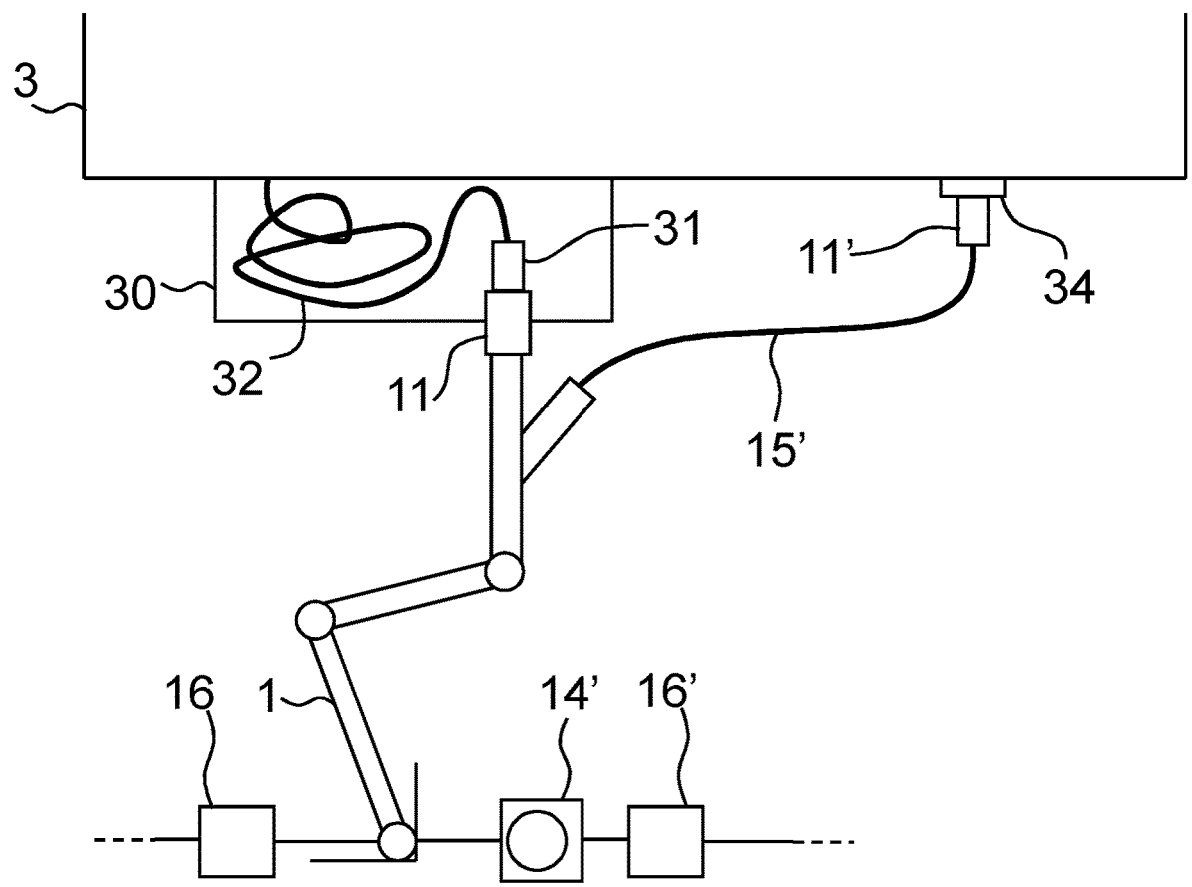
FIG. 9 shows a detailed view of a further embodiment example.

This is illustrated in FIG. 9, in which the arm 1 is positioned so as to present the movable connector 11 in the vicinity of the basket 30. An operator can manually insert the connector 31 into the movable connector 11, which movable connector is connected to the power supply network by the junction unit 16. The arm 1 is provided with an ejection mechanism of the connector 31 from the movable connector 11, so that, in order to perform the disconnection, the movable connector 11 automatically expels the connector 31, and the mechanical arm 1 withdraws.

The arm 1 is further equipped with a movable data connector 11', connected to a rewinder 14' and connected to the data transmission network by means of a data junction unit 16'. The refrigerated container 3 is equipped with a data connector 34. The operator manually picks up the movable data connector 11' and connects it to the data connector 34 on the container 3. The data connector 34 is provided with an ejection mechanism from the movable data connector 11', so that it ejects the movable data connector 11' when disconnection is required, and the movable data connector 11' is withdrawn on the arm 1 by rewinding the data cable 15' on the rewinder 14'.

From the above it is possible to realize different embodiments of the system with different functionalities and levels of sophistication.

A first embodiment provides a switchboard 2 for each container and a mechanical arm 1 for each slot of the reefer rack and 2, placed in front of each container 3, with a pointing system to automatically guide the arm 1 to the mechanical arm side connector 21.

A second embodiment provides a simple telescopic mechanical arm 1 movable with a horizontal (by planes) and/or vertical translation system, for example a translation linked to the horizontal and/or vertical uprights of the carpentry.

A third embodiment provides a mechanical arm 1 with an autonomous handling and recognition capacity of the basket 30. The pointing system provides for the recognition of the connector 31 inside the basket 30 and for the replication of the human activities of extraction of the connector 31 and relocation of the cable 32 in the basket 30 for connection to the socket on the rack.

It is possible to identify different configurations from the above.

In a first embodiment example called "one to one", an arm 1 is provided for each storage position of the containers 3 (slots). In this case the arm 1 is able to carry out both the connection and the disconnection automatically, minimizing the manual intervention which, if the container 3 is not already equipped with a fixed switchboard 2, is limited to the initial application of the switchboard 2 to the container 3 by an operator in correspondence with the unloading of the container 3. The arm 1 is optionally able to hold the switchboard 2 in a removable configuration upon final delivery of the container 3.

In a second embodiment, called "travelling arm", a plurality of containers is connected with a single mechanism; the system consists of a robotic arm 1 which has a gripper at its end, designed to take the movable connectors 11 and connect them to the connectors on the mechanical arm 21 of the switchboards 2 on the containers 3: in this case the robotic arm 1 moves on vertical and/or horizontal slides or guides to reach any of the slots of the structure of the reefer rack.

Each slot is equipped in its fixed part (i.e. integral with the reefer rack) with a movable connector 11 compatible with the above engagement mechanism, connected to a cable 15 wound on a rewinder 14 with controllable retrieval, which is connected, upon command of the system, from the arm 1 itself to the switchboard 2 on the container 3.

On the head of the arm 1 a suitable gripper is mounted, able to grip the movable connector 11 connected to the cable 15 positioned on the fixed part of the reefer rack, and to engage the movable connector 11 with the mechanical arm side connector 21 of the switchboard 2 present on the container 3 itself.

A fourth embodiment example, called "movable platform", is the adaptation of the "travelling arm" configuration to situations in which there is no metal joinery (reefer rack) that allows the storage and access of containers 3. This solution is suitable for cases in which containers 3 are stored in areas not equipped with "flying" connections.

In this case the arm 1, equipped with a gripper as in the case of "travelling arm", is mounted on a movable platform as shown in FIG. 6, allowing the movable connectors 11 connected to the cable winders 14 mounted on the ground to be connected to the containers 3.

A fourth embodiment example called "Release only" refers to a simplified configuration which provides a movable arm 1 for each slot, in which each arm 1 mounts on its top a movable connector 11 provided with an automatic ejection mechanism of the connector 31.

This solution can be indicated both to simplify Container Terminal operations with mainly Transhipment traffic, and to manage the disconnection of containers 3 in the holds on board ship.

This configuration also provides the possibility of connecting a data cable 15' with a movable data connector 11' to the head of the arm 1, in turn equipped with an ejector and a recovery mechanism 14' of the data cable 15' by the arm 1 if required.

Downstream of the first connection, the operator connects the plug to the head of the arm 1 and positions the arm 1 above the basket 30 so that the ejector releases the connector 31 and the cable 32 directly in the basket 30.

Following a command synchronized with the Terminal Operating System (TOS) or of the ship, the arm 1 expels the connector 31 directly in the basket 30, allowing the movement of the container 3 and automatically returning to the rest position.

What is claimed:

1. A system for connecting and/or disconnecting a power supply and/or data connection for refrigerated containers (3) in a port and/or storage and interchange field and/or on board ship, each container (3) is provided with at least one electrical connector (31, 21) for connection to a power supply and/or data transmission network, the system comprising:
   at least one automated mechanical arm configured for electrical connection and disconnection of the said electrical connector (31, 21) to the said power supply and/or data transmission network; and
   a switchboard (2) fixed to a respective container (3) and including
      at least one container side connector (23) configured to connect to the connector (31) of the respective container (3), and
      at least one mechanical arm side connector (21) configured to connect with the power supply and/or data transmission network,
      wherein the container side connector (23) and the mechanical arm side connector (21) are electrically connected to each other inside the switchboard (2).

2. The system according to claim 1, wherein the switchboard (2, 2') has a transmission unit via radio waves of data received from the respective container (3).

3. The system according to claim 2, wherein a movable connector (11) connected to the power supply and/or data transmission network is provided, which movable connector (11) is moved by the mechanical arm (1) for coupling and/or decoupling of the movable connector (11) to the mechanical arm side connector (21) of the switchboard (2).

4. The system according to claim 3, wherein the movable connector (11) is connected to the power supply and/or data transmission network via an electric cable (15) wound on an automatic winder (14).

5. The system according to claim 4, wherein the mechanical arm (1) has a pointing system for identifying a position of the mechanical arm side connector (21) of the switchboard (2).

6. The system according to claim 1, which wherein the system is configured for installation on a refrigerated container access structure, which access structure comprises a plurality of stations, each station being provided for a respective container, wherein for at least part of the stations a dedicated mechanical arm (1) is provided for each station.

7. The system according to claim 6, wherein the mechanical arm (1) is translatable on at least two axes, and a moving mechanism for displacing the mechanical arm (1) are provided such that the mechanical arm (1) can be placed at each container (3) of a plurality of said containers.

8. The system according to claim 7, wherein the mechanical arm (1) is provided at its free end with a gripping member for a said movable connector (11).

9. A system for connecting and/or disconnecting the power supply and/or data connection for refrigerated containers (3) in the port and/or storage and interchange field and/or on board ship, each container (3) is provided with at least one electrical connector (31, 21) for connection to a power supply and/or data transmission network, the system comprising:
   at least one automated mechanical arm configured automated means for the electrical connection and disconnection of the said electrical connector (31, 21) to the said power supply and/or data transmission network; and
   a switchboard (2') fixed and integrated in a respective container (3) and including at least one mechanical arm side connector (21) configured to connect with the power supply and/or data transmission network.

* * * * *